(No Model.)
C. WESELY.
WASH TUB, SINK, OR OTHER VESSEL MADE OF CEMENT, &c.
No. 327,209. Patented Sept. 29, 1885.
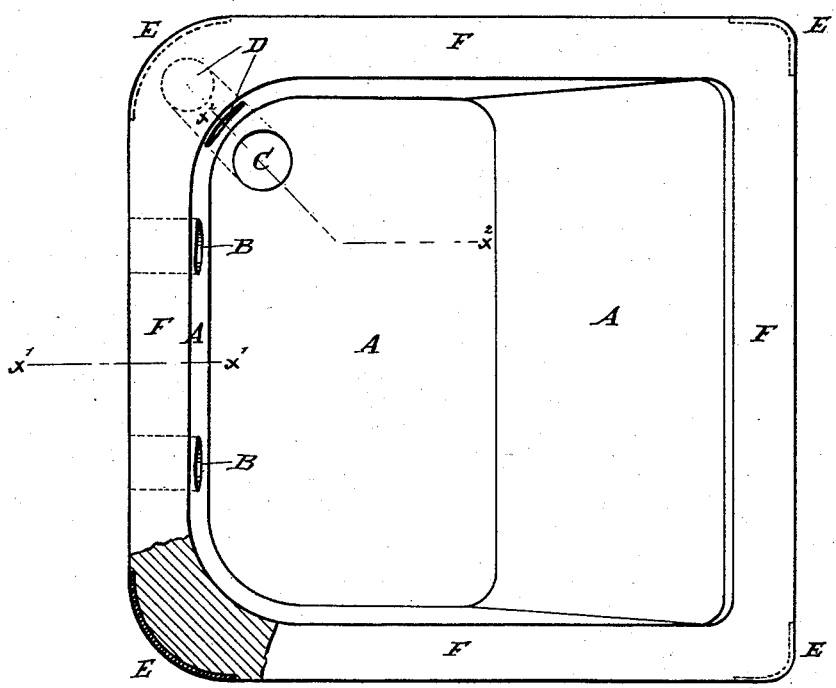
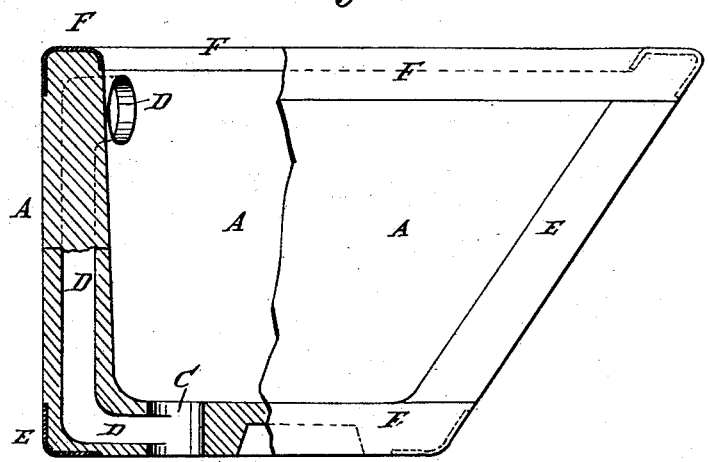
WITNESSES:
Chas. Nida
C. Sedgwick
INVENTOR:
C. Wesely
BY Munn & Co.
ATTORNEYS.

UNITED STATES PATENT OFFICE.

CARL WESELY, OF WEST NEW YORK, NEW JERSEY.

WASH-TUB, SINK, OR OTHER VESSEL MADE OF CEMENT, &c.

SPECIFICATION forming part of Letters Patent No. 327,209, dated September 29, 1885.

Application filed August 12, 1884. (No model.)

*To all whom it may concern:*

Be it known that I, CARL WESELY, of West New York, in the county of Hudson and State of New Jersey, have invented a certain new and useful Improvement in Wash-Tubs, Sinks, and other Vessels Made of Cement and Cement Compositions, of which the following is a full, clear, and exact description.

Reference is to be had to the accompanying drawings, forming a part of this specification, in which similar letters of reference indicate corresponding parts in both the figures.

Figure 1 is a plan view of a cement washtub to which my improvement has been applied, part being broken away to show the construction. Fig. 2 is a side elevation of the same, partly in section, as indicated by the lines $x\ x$, $x'\ x'$, and $x^2\ x^2$, Fig. 1.

The object of this invention is to prevent the angles and edges of cement wash-tubs, sinks, and other vessels from being accidentally broken off, and to promote the strength and durability of such vessels.

The invention consists in a wash-tub, sink, or other vessel formed of cement or a cement composition, made with its outer angles and corners and its upper edge faced with metal strips embedded in the body of the said vessel, whereby the said angles, corners, and upper edge will be protected from accidental injury, as will be hereinafter fully described.

A represents the body of a wash-tub which is formed of cement or cement composition placed, while in a plastic state, in a mold. The body A is provided with one or more openings, B, in its rear side to receive waterpipes, with a discharge-opening, C, in its bottom, and with an overflow opening and passage, D, leading from the upper part of the tub to the discharge-opening C, as shown in the drawings.

The angles around the bottom of the tub A and between the front and rear sides and the ends are strengthened by strips E of metal placed in the mold, so that they will be so embedded in the cement forming the body A of the tub that their outer surfaces will be flush with the outer surfaces of the said tub, as shown in Figs. 1 and 2.

The upper edge of the sides and ends of the tub A are faced with strips F of metal, which are made with flanges along their side edges, overlapping the outer and inner surfaces of the said tub adjacent to the said upper edge. The strips F are embedded in the cement so that the outer surfaces of the flanges of the said strips will be flush with the outer and inner surfaces of the said tub, as shown in Fig. 2. With this construction the edges, angles, and corners of the tub will be so protected that they will not be liable to be broken or chipped off by an accidental blow, and the tub will be much stronger and more durable than when made without the metal strips.

The metal strips E F are all secured to each other by solder, rivets, or other suitable means, so as to form a metal frame inclosing the tub.

I have shown and described my invention as applied to wash-tubs, but do not limit myself to that use, as it can be applied with equal advantage to sinks and various other vessels.

Having thus described my invention, I claim as new and desire to secure by Letters Patent—

1. As a new article of manufacture, a washtub, sink, or other vessel made substantially as herein described and shown, with its angles and corners and its upper edges faced with metal strips embedded in the cement or cement compound forming the said vessel, as set forth.

2. As a new article of manufacture, a washtub, sink, and other articles made substantially as herein described, the upper edges of the vessel of metal strips F, having flanges embedded in the outer and inner surfaces of the cement or cement compound, as and for the purpose set forth.

CARL WESELY.

Witnesses:
JAMES T. GRAHAM,
C. SEDGWICK.